(12) United States Patent
Hoke et al.

(10) Patent No.: US 8,831,277 B1
(45) Date of Patent: Sep. 9, 2014

(54) OPTICAL HELMET TRACKING SYSTEM

(75) Inventors: Jaclyn A. Hoke, Cedar Rapids, IA (US);
David W. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1064 days.

(21) Appl. No.: 12/572,542

(22) Filed: Oct. 2, 2009

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | | |
|---|---|---|---|---|
| 4,945,500 | A * | 7/1990 | Deering | 345/422 |
| 7,723,253 | B2 * | 5/2010 | Rodriguez | 502/85 |
| 8,245,623 | B2 * | 8/2012 | Weaver | 89/41.05 |
| 8,340,908 | B2 * | 12/2012 | Hess et al. | 701/519 |
| 8,487,838 | B2 * | 7/2013 | Lewis et al. | 345/8 |
| 2006/0027404 | A1 * | 2/2006 | Foxlin | 178/18.06 |
| 2007/0027451 | A1 * | 2/2007 | Desinger et al. | 606/50 |
| 2008/0048931 | A1 * | 2/2008 | Ben-Ari | 345/8 |
| 2008/0186255 | A1 * | 8/2008 | Cohen et al. | 345/8 |
| 2009/0216910 | A1 * | 8/2009 | Duchesneau | 709/250 |
| 2010/0171834 | A1 * | 7/2010 | Blumenfeld | 348/159 |
| 2011/0222745 | A1 * | 9/2011 | Osterhout et al. | 382/118 |
| 2012/0081248 | A1 * | 4/2012 | Kennedy et al. | 342/118 |
| 2012/0212499 | A1 * | 8/2012 | Haddick et al. | 345/589 |

* cited by examiner

*Primary Examiner* — Nancy Bitar
(74) *Attorney, Agent, or Firm* — Donna P. Suchy; Daniel M. Barbieri

(57) ABSTRACT

The present invention includes a distributed, parallel processing optical helmet tracking system. The system includes at least one imaging sensor mounted to a helmet that outputs image data at a first helmet orientation and at a second helmet orientation. The system uses a plurality of processors, each of which receives from the imaging sensor, data representative of an independently viewable, complete and separate image subsection. A designated processor receives output data from each of the plurality of processors, and processes such output data to generate a signal which is representative of differences between the first helmet orientation and the second helmet orientation. The invention also includes methods for determining movement of a sensor.

7 Claims, 5 Drawing Sheets

OPTICAL HELMET TRACKING SYSTEM

CROSS REFERENCE TO RELATED APPLICATIONS

This application relates to the following applications filed on even date herewith and each incorporated herein by these references in their entirety:
Multiprocessor Discrete Wavelet Transform by John K. Gee, Jennifer A. Davis, David W. Jensen and James Potts having Ser. No. 12/572,600 Custom Efficient Optical Distortion Reduction System and Method by David W. Jensen, Richard D. Tompkins and Susan Robbins having Ser. No. 12/572,669 Multiple Aperture Video Imaging System by David W. Jensen and Steven E. Koenck having Ser. No. 12/572,492.

FIELD OF THE INVENTION

The present invention relates to optical helmet tracking and more specially to improved systems and methods for helmet tracking using simultaneous localization and mapping (SLAM) algorithms and more particularly to the use of distributed processing solutions for the localization component of a visual SLAM algorithm to track movement of a helmet.

BACKGROUND OF THE INVENTION

In the past helmet tracking has been done with optical, mechanical, ultrasonic, and magnetic techniques; each with various deficiencies. Common deficiencies are that the necessary computational hardware is often power hungry, relatively slow or generates excess heat or are more prone to system crashes due to the complex computations that have been required in the past.

SLAM typically refers to the problem of a moving sensor platform, such as a vehicle, a robot, or a human, and constructing a map of the environment surrounding the sensor platform, while concurrently estimating the location and motion of the platform through the environment. The use of cameras as part of the sensor platform adds another layer of complexity to the SLAM problem. Typically SLAM is run on a single image or stereo pair of images by a single processor to produce an independent SLAM solution for that one image or pair of images.

Natural features within the environment are used to construct the map and estimate the location and motion of the platform. An Extended Kalman Filter is used to continuously and dynamically update the map. The map is represented by a state vector $\hat{x}$ and a covariance matrix P. The state vector is composed of the stacked state estimates of the camera and features and P is a square matrix of equal dimension which can be partitioned into sub matrix elements in the following manner:

$$\hat{x} = \begin{pmatrix} \hat{x}_v \\ \hat{y}_1 \\ \hat{y}_2 \\ \vdots \end{pmatrix}$$

$$P = \begin{bmatrix} P_{xx} & P_{xy_1} & P_{xy_2} & \cdots \\ P_{y_1 x} & P_{y_1 y_1} & P_{y_1 y_2} & \cdots \\ P_{y_2 x} & P_{y_2 y_1} & P_{y_2 y_2} & \cdots \\ \vdots & \vdots & \vdots & \ddots \end{bmatrix}$$

Known approaches to solving SLAM problems suffer from being computationally complex and time consuming and involve using a single processor for a single image or stereo pair. Increasing processing power may increase overall speed and reduce the time needed to complete the computation and thus may approximate a real time visual SLAM system. But the increased processing power means increased drain on power sources. This is particularly problematic for portable systems where power sources are limited in size and in the amount of power that can be provided. Other techniques used to speed up computation, e.g. parallelizing the code run on the processor, suffer their own problems including the need to rewrite source to properly parallelize the code.

Several attempts have been made to increase the usefulness of SLAM systems. Sometimes called distributed SLAM, these systems use data fusion in two distinct ways: a system comprised of multiple robots, each with a single sensor, or a system comprised of a single robot obtaining readings from multiple sensors of different types, i.e. an UltraViolet (UV) sensor and an InfraRed (IR) sensor. The added complexity of these distributed systems only increases the computational power requirements of making a real time visual SLAM system. The present invention overcomes one or more of these problems.

SUMMARY OF THE INVENTION

The present invention includes a distributed, parallel processing optical helmet tracking system. The system includes at least one imaging sensor mounted to a helmet that outputs image data at a first helmet orientation and at a second helmet orientation. The system uses a plurality of processors, each of which receives from the imaging sensor, data representative of an independently viewable, complete and separate image subsection. A designated processor receives output data from each of the plurality of processors, and processes such output data to generate a signal which is representative of differences between the first helmet orientation and the second helmet orientation.

The invention also includes a distributed parallel processing, optical, human worn helmet tracking system for determining movement of a sensor. The one or more sensors are sensitive to the same frequencies of electromagnetic energy and output data from the sensors is divided into a plurality of independently viewable, complete and separate image subsections. A plurality of processors 1) receives data representative of one of the plurality of subsections, 2) determines at least one parameter for the subsection, and 3) outputs the at least one parameter. A designated processor receives data at least partially representative of the at least one parameter from the plurality of processors and calculates the global motion of the one or more sensors.

The invention also includes methods for determining movement of a sensor that include segmenting, into a plurality of independently viewable, complete and separate image subsections, data provided as an output from one or more sensors. For each subsection of data, on a separate processor, calculating at least one parameter for the subsection of data. On a designated processor, calculating the global motion of the one or more sensors from the calculated at least one parameter for each subsection of data.

DEFINITIONS

"Independently viewable, complete and separate image subsections" shall hereafter be construed to mean: components of an array of image tiles which are either viewable portions of a larger image of a larger area which has been subdivided into smaller image subsections or complete small viewable images of small areas, which when stitched together into an array, substantially recreate a larger image of a larger area. Note: adjacent subjections may not be completely separate in that it may be desirable to have relatively small areas of overlap at the periphery of each subsection.

"SLAM" shall mean the simultaneous localization and mapping algorithms which are well known in the art.

"Global Motion" of the helmet or head is calculated for each image frame and provides an absolute position and orientation of the helmet or head in the world reference frame.

DETAILED DESCRIPTION

Figure 1:
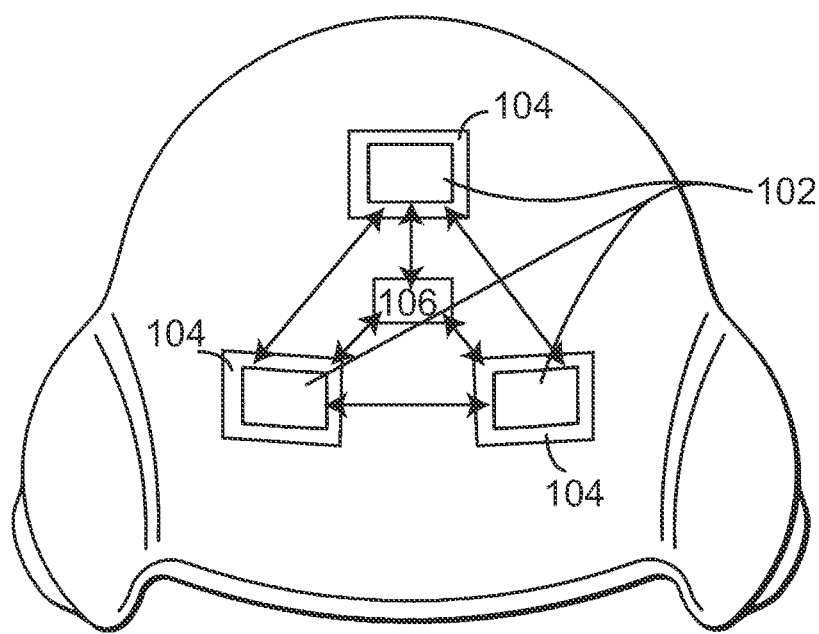
FIG. 1 shows a typical environment for a helmet tracking system.

FIG. 1 shows a helmet, generally designated 100, with three image sensors 102 mounted above the face of the user illustrates a helmet tracking system in a typical environment. Each sensor 102 is shown disposed on a computing die 104 which communicates with its respective sensor 102 via connections located between the sensor die and the computing die. Also shown is a central computer 106 which is coupled to the sensors 102 via a star network. In an alternate embodiment the sensors are coupled to each other (through their respective computing die) via a mesh network which includes two way connections between each computing die 104. The present invention includes a real time SLAM system on a moving sensor platform that includes distributing the computations across multiple microprocessors. In general, the captured image data is divided into independently viewable, complete and separate image subsections which are then distributed across multiple microprocessors for partial SLAM processing. Partially processed SLAM data from each of the subsections are then recombined and further processed to determine the global motion of the sensor platform, i.e. for the entire captured image or the array of independently viewable, complete and separate image subsections. In one preferred embodiment, the invention provides a real time visual SLAM system to operate on data representing images.

The present systems include one or more sensors on a mobile platform. When utilized, the multiple sensors possibly preferably are sensitive to the same physical characteristic such as visible or infrared electromagnetic energy. Possibly preferably, the sensors are sensitive to visible light and may be generally called imaging sensors. The imaging sensors include a digital component used to capture data for the images, such as a Charge Coupled Device (CCD). Other digital components may include the processors for digital computing, a communication network processor, and normal digital memory for data storage. The imaging sensor may also include components such as lenses, filters, mirrors, etc. that enhance the captured image.

The mobile platform is any structure that is large enough to carry at least one sensor where the structure is not permanently affixed to the ground or a building (although it may be temporarily affixed). Exemplary mobile platforms include land, water and air vehicles, whether manned or unmanned, whether autonomous, semi-autonomous, remote controlled or human operated. Some of the preferred mobile platforms include human or animal mountable platforms such as a helmet or clothing. Other preferred mobile platforms include robots such as unmanned aerial vehicles or ground based reconnaissance robots.

No particular number of sensors on a platform is required, but a plurality of sensors may be preferred in order to have the benefit of parallax and thus depth perception.

A system with at least one sensor mounted on a helmet may be a preferred embodiment because of the helmet tracking capabilities provided by the SLAM solutions discussed below. As discussed above, SLAM is able to determine the motion of a platform. In the helmet mounted sensor context, as the user moves his head, the data from the imaging sensors changes. The motion of the helmet can be determined from these changes in the image data through the use of SLAM. Put another way, motion of the helmet corresponds to changes in the orientation of the helmet (and head) relative to the user's surroundings. Differences between a first orientation and a second orientation of the helmet indicate motion of the helmet. In this way, SLAM can be used to provide helmet tracking capabilities. SLAM using data captured by an imaging sensor on a helmet can thus provide an optical helmet tracking system. The distributed processing techniques discussed below enable real time determination of helmet orientation because of the speed at which SLAM can be carried out.

Helmet tracking is important in many advanced military applications including in airplanes, tanks, other weapons systems, ground transportation, etc. Namely, users in these applications require, for example, heads-up-displays that move with the helmet.

The sensors capture data sets, and possibly preferably images, at discrete moments in time. For image data, this comprises capturing individual frames, with the frames separated in time. In this way, differences between the images can be analyzed. Possibly preferably, images are captured at or near video speeds. Moreover, the sensors may also capture data at discrete locations; e.g. two sensors adjacent to each other.

Each captured data set may be divided into independently viewable, complete and separate image subsections so as to reduce the size of the data block being operated on. See FIG. 2. The data can be divided using various methodologies depending upon the requirements of a particular application. However, the present invention contemplates that whenever image data is divided for the purpose of parallel processing that it be divided into independently viewable, complete and separate image subsections.

Dividing the data has three advantages. First, smaller data blocks are easier to move than larger data blocks. Second, smaller data blocks are easier to process than larger data blocks. Lastly, multiple data blocks provides for the ability to perform parallel processing The present systems include a plurality of processors. The processors are typically rather simple in that they are designed to accomplish only one or a few types of tasks. The emphasis is on speed rather than flexibility. For example, processors that include arithmetic logic units (ALU) are preferred over processors that include floating point units (FPU). Suitable processors include low power Intel or DSP processors, such as the Intel Pentium II or Texas Instruments TMS320C60 processor, or a custom low power processor such as the Rockwell Collins AAMP. In addition, some or all of the processors in the plurality of processors may be located on multicore processors.

Figure 2:
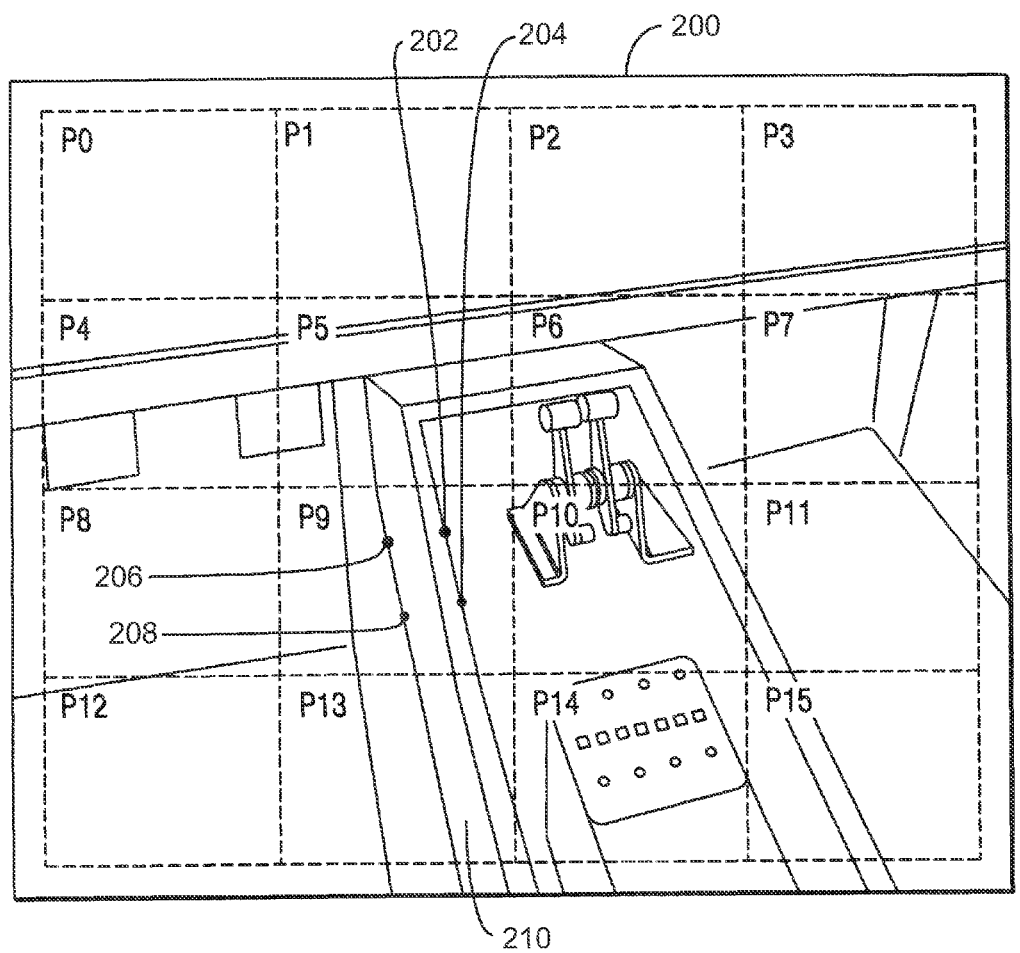
FIG. 2 shows how a single image frame captured by a single camera may be divided into subsections.

FIG. 2 shows a single image frame 200 of a cockpit of an aircraft captured by a single imaging sensor which has been divided into an array of independently viewable, complete and separate image subsections. In this example, the image is divided into 16 independently viewable, complete and separate image subsections P0-P15, with the data from each subsection processed by one of 16 processors. For example, if an airborne camera were to capture a single scene image of the ground, that image could be divided into an array of independently viewable, complete and separate image subsections, where each independently viewable, complete and separate image subsection is a complete image of a separate geographic subsection of the entire geographic area captured in the single scene image. A single scene image captured by a single camera and subsequently divided into 16 geographic subsections would be deemed to be 16 independently viewable, complete and separate image subsections as also would the output of an array of 16 cameras each capturing a small image, so that when the 16 small images are stitched together it would result in the same single larger image.

Each processor from the plurality of processors completes one or more computations on the subsection to determine at one least one parameter for that subsection. Parameters that may be computed by the processor for each subsection include identifying one or more feature points in each subsection. A feature point is a location in an image that may be tracked from one image to another. Feature points typically include points, edges, corners, etc. that are distinguishable from the surrounding neighborhood in the image. Four representative feature points are shown in FIG. 2. Section P9 shows feature points 202, 204, 206, and 208. Which represent corners of a console 210 in the image 200. Selection of feature points may be done using know techniques such as Harris Corner Detection and the Kanade-Lucas-Tomasi (KLT) tracking algorithm.

Feature points may be tracked locally such that corresponding subsections of two data blocks (e.g. images) are sent to the same processor so that processor is able to compute the change in position of the feature points between the first and second image. See FIG. 3.

Another parameter that may be computed for each subsection of the image includes a local motion state vector 502 for the subsection. The local motion state vector is computed from the local feature points described above and describes the local motion of a subsection. The state vector comprises information on roll, pitch, yaw, and movement in the XYZ directions. Stated alternatively, the state vector consists of a 3-Dimensional metric position vector $r^W$, orientation quaternion $q^{RW}$, velocity vector $v^W$, and angular velocity vector $\omega^R$ relative to a fixed world frame W and a reference frame R carried by the sensor (e.g. camera or imaging sensor):

$$x_v = \begin{pmatrix} r^W \\ q^{WR} \\ v^W \\ \omega^R \end{pmatrix}$$

After initialization, the state vector is updated in two alternating steps: the prediction step where the sensor moves between two image captures, and the update step where measurements of the feature points described above in the image are taken, respectively and modeled in the form:

$$P(x_k, m | Z_{0:k-1}, U_{0:k}, x_0) = \int P(x_k | x_{k-1}, u_k) \times P(x_{k-1}, m | Z_{0:k-1}, U_{0:k-1}, x_0) dx_{k-1}$$

$$P(x_k, m | Z_{0:k}, U_{0:k}, x_0) = \frac{P(z_k | x_k, m) P(x_k, m | Z_{0:k-1}, U_{0:k}, x_0)}{P(z_k | Z_{0:k-1}, U_{0:k})}.$$

Thus, the plurality of processors output a set of one or more feature points or a set of local motion state vectors 502. The number of elements in the set corresponds to the number of processors in the plurality of processors. As seen in FIG. 2, subsection $P_0$ would correspond to one processor which would calculate a parameter for that subsection. And the 16 processors would output a set of 16 parameters.

The present systems also include a designated processor that computes the global motion of the sensor platform from the output(s) of the plurality of processors. The designated processor may be one of the plurality of processors or may be in addition to the processors in the plurality of processors. The designated processor may be the same type of processor as the processors in the plurality of processors or it may be of a different type of processor. The designated processor does not need to be the same processor every time for a given frame and/or algorithm. A scheduler or resource management process can be used to select the most appropriate choice for the designated processor. Possibly preferably, the designated processor is of a type that is matched to computational task, such as an FPU.

When the output from the plurality of processors includes local feature points, then the designated processor computes a global motion vector from the local feature points. See FIG. 3 When the output from the plurality of processors includes local state vectors, then the designated processor computes a global motion from the local state vectors. See FIG. 5 For the later calculation, the global motion of the sensors may be calculated by mathematically combining the local state vectors into a global state vector that describes the global motion of the sensors. In the alternative, the global motion of the sensors may be calculated by generating a set of global feature points from the local state vectors. From the global feature points, the global state vector may be calculated.

Figure 3:
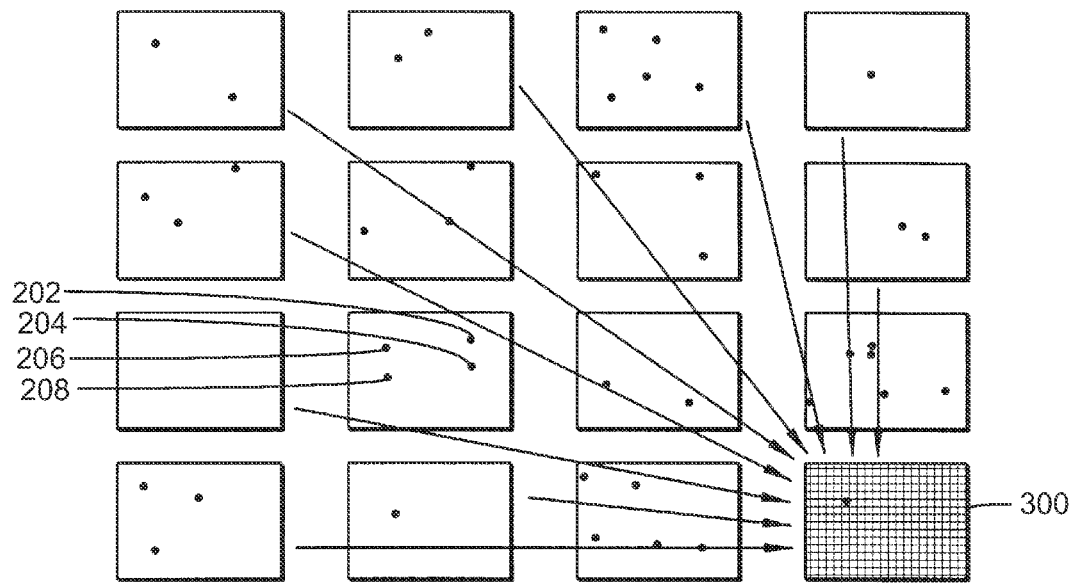
FIG. 3 shows how data is communicated to a designated processor for calculation of the global motion of the imaging sensor.
Figure 4:
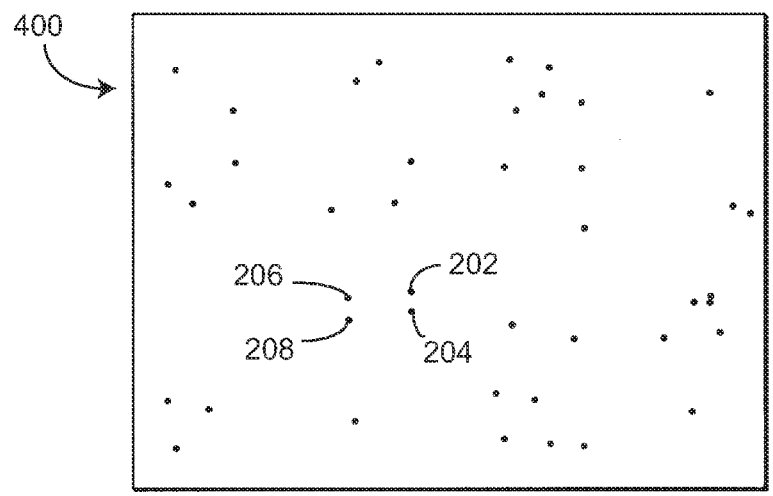
FIG. 4 shows a global collection of feature points.

Feature points can be selected and tracked (or matched) locally with each processor handling the computations for the corresponding subsections of the image. The coordinates of the feature points must be with respect to a common frame of reference. The locations of all of the corresponding feature points selected in all the subsections of the image frames are accumulated see FIG. 3 where the solid arrows show the data path of feature points to a designated processor 300 that performs the computations necessary to determine the global motion as seen in FIG. 4.

Figure 5:
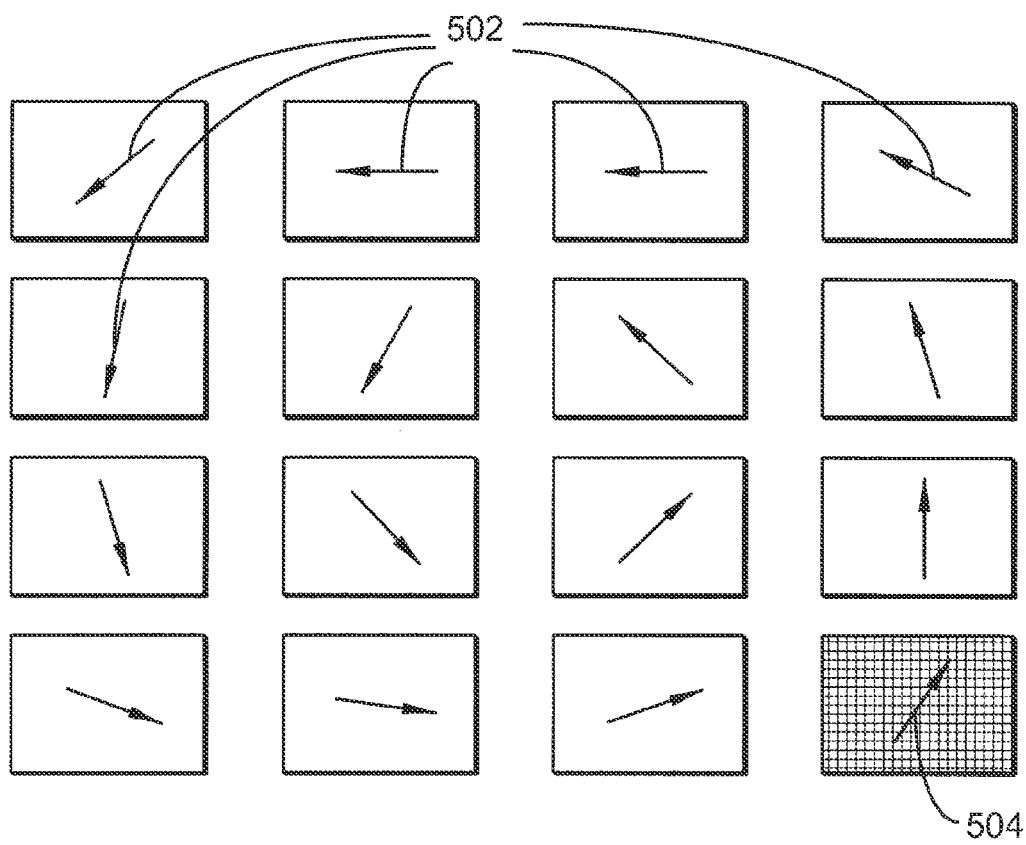
FIG. 5 shows locally calculated motion vectors across sixteen processors.

Another approach involves the most local computation, and has two variants. In both variants feature points are selected and tracked locally, the local points are used to calculate local motion, and the local motions are communicated to a designated processor for additional computation. These locally computed motion vectors are shown in FIG. 5. FIG. 5 clearly shows that the local motions 502 perceived by each processor do not reflect the true global rotation 504 of the platform. In the first variant, the global motion is computed directly from the local motions. Representing the local motion estimate with a vector allows the use of a least squares optimization technique for deriving the overall motion. This vector contains the local processors computed interpretation of the rotation and translation of motion for the platform. This is also represented as [Rp,Tp] in matrix notation. The vectors (or rotation and translation information) are transmitted and gathered on one processor in the same fashion as shown in FIGS. 3 and 4, with respect to feature points. The processor would convert the local vectors to the global space by applying an appropriate transformation. Typically a simple sensor location translation would be applied to the local motion [Ts][Rp,Tp]. The set of locally computed motions are combined using a least squares optimization technique to produce a more accurate global vector [Rg,Tg] 504. The second variant uses the local motion to generate a set of global feature points that are then used to compute the global motion. The local vectors are again gathered in a single processor and it would compute a set of global transformed features points. These points would be used in the normal process to compute the global vector [Rg,Tg].

In addition, the present invention includes methods for helmet tracking. The methods include capturing a plurality of images over time with a plurality of imaging sensors mounted on helmet. Next, the methods include calculating the motion of the helmet from the differences between the two images using SLAM as more fully discussed below.

The present invention also includes methods of efficiently processing data. The methods include segmenting captured data into subsections, where the data possibly preferably is provided by one or more sensors. The data is segmented into a number of subsections corresponding to the number of processors contained in the plurality of processors. The data is segmented by various known technologies for segmenting data. Each subsection of data is communicated to one processor within the plurality of processors.

The present methods also include calculating a parameter for each subsection using a separate processor for each subsection. Once the subsection of data is received at the processor, the processor calculates one or more local feature points for the subsection or calculates a local motion state vector for the subsection.

The present methods also include calculating from the parameters a global motion for the captured data using a designated processor.

In one embodiment, each of the processors in the plurality of processors communicates the result it calculated directly to the designated processor. See FIGS. 3 and 5. The amount of data moved is equal to the number of processors in the plurality of processors, if the designated processor is separate from the plurality of processors. In the alternative, the amount of data moved is equal to one minus the number of processors in the plurality of processors, if the designated processor is one of the plurality of processors.

Figure 6:
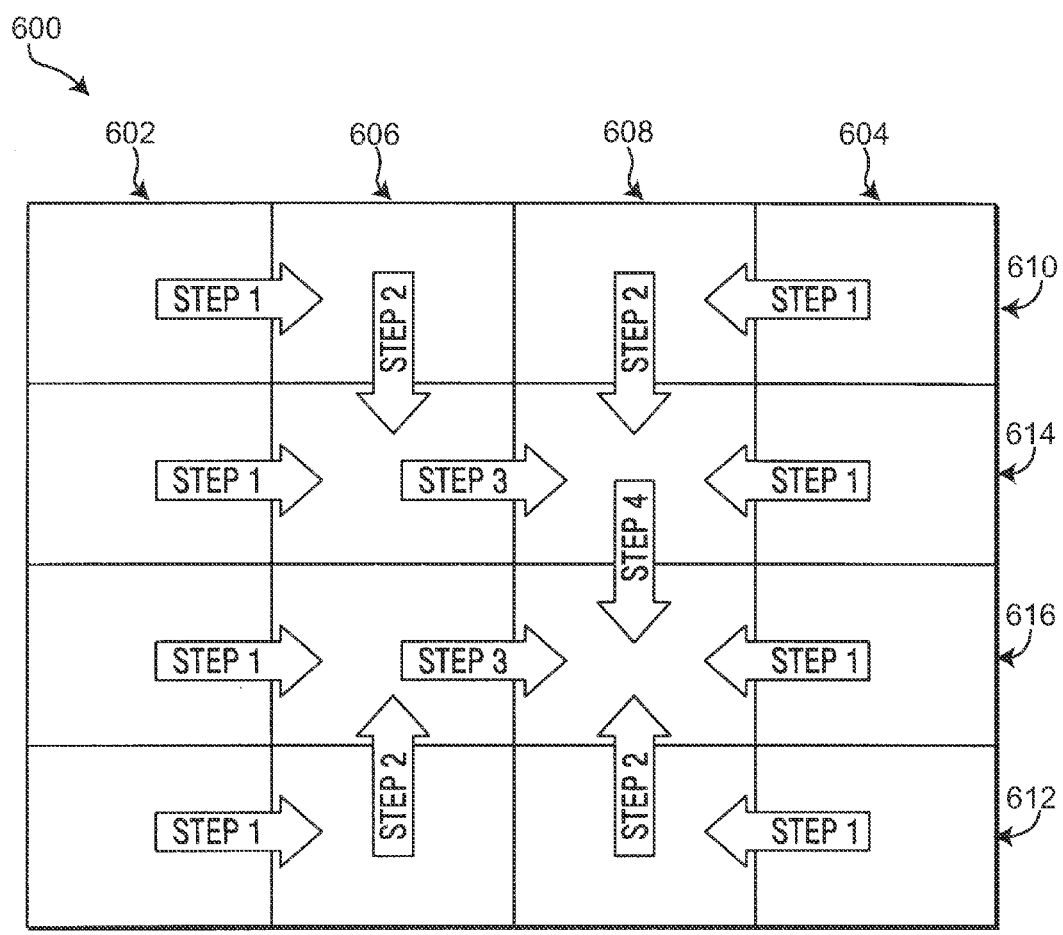
FIG. 6 shows a cascade data movement scheme that further reduces the amount of required data movement.

In another embodiment, the amount of data movement is reduced by using a cascading calculation. See FIG. 6. In this embodiment, each outer most columns 602 and 604 of processors calculate their parameter first and communicates (step 1) their result to the adjacent processor, in the internal columns 606 and 608, respectively. These processors then compute their own parameter and combine it with the result they received. In step 2 the exterior rows 610 and 612 communicate their information inwardly. Next the internal cells of column 606 communication to the internal rows of column 608. This is step 3. Lastly Step 4 involves the column 608 row 614 data to get moved to column 608 row 616 which would be known as the designated processor. Regardless of how the designated processor receives the data, the calculating step includes calculating the global motion of the sensor and/or platform with the designated processor. The calculating step may include calculating the global state vector by mathematically combining the local state vectors. In the alternative, the calculating step may include calculating the global state vector from a set of global feature points.

Almost any optical tracking system can use these methods for distributed processing because they are usually comprised of two primary components. The first is a feature point extractor like the Harris corner detector or Scale Invariant Feature Transform (SIFT) and a feature matching technique like normalized cross-correlation or nearest-neighbor with distance ratio, or a combined feature extractor and tracker like the KLT algorithm. The second is an algorithm for platform motion/pose estimation. Platform motion estimates can be done using methods besides SLAM, like the eight-point algorithm and the direct linear transformation.

It will be further appreciated that functions or structures of a plurality of components or steps may be combined into a single component or step, or the functions or structures of one-step or component may be split among plural steps or components. The present invention also contemplates that individual item on lists discussed above may be combined with other individual items from that same list or different lists. Furthermore, it is contemplated that one or more individual items may be eliminated from the lists discussed above and combined with other lists. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A distributed parallel processing helmet mounted optical helmet tracking system, comprising:
   A plurality of imaging sensors mounted to a single helmet so that each of said plurality of imaging sensors outputs image data at a first helmet orientation and at a second helmet orientation;
   a plurality of processors, each of which receives data representative of an independently viewable, complete and separate image subsection, and each of which performs a portion of a distributed parallel processing operation;
   a designated processor that at least indirectly receives output data from each of said plurality of processors, and processes such output data to generate a signal which is representative of differences between the first helmet orientation and the second helmet orientation; and
   wherein the plurality of sensors comprise a visible light sensor;
   wherein said plurality of sensors comprises a plurality of image sensors, each configured to monitor only an identical set of predetermined frequency ranges of electromagnetic radiation;
   wherein each imaging sensor of the plurality of imaging sensors generates an independently viewable, complete and separate image subsections.

2. A distributed parallel processing optical human worn helmet tracking system for determining movement of a sensor, comprising:
   a plurality of sensors sensitive to the same frequencies of electromagnetic energy, wherein the plurality of sensors output sensor data divided into a plurality of independently viewable, complete and separate image subsections;
   a plurality of processors, wherein each processor of said plurality of processors performs a portion of a distributed parallel processing operation where each processor of said plurality of processors:
     receives data representative of one of the plurality of independently viewable, complete and separate image subsections,
     determines at least one parameter for the independently viewable, complete and separate image subsection and
     outputs the at least one parameter;
   a designated processor that at least indirectly receives data at least partially representative of the at least one parameter from the plurality of processors and calculates the global motion of the plurality of sensors;
   wherein the at least one parameter is one of:
     a. a feature point for each of the independently viewable, complete and separate image subsections; and
     b. a state vector for each of the independently viewable, complete and separate image subsections;
   wherein the plurality of sensors comprise a visible light sensor;
   wherein said plurality of sensors comprises a plurality of image sensors, each configured to monitor only an identical set of predetermined frequency ranges of electromagnetic radiation; and
   wherein the plurality of image sensors are each mounted on a single human worn helmet.

3. A method of determining movement of a sensor, comprising:
   segmenting, into a plurality of independently viewable, complete and separate image subsections, data provided as an output from a sensor;
   for each independently viewable, complete and separate image subsection of data, on a separate processor, calculating at least one parameter for the subsection of data so as to perform a portion of a distributed parallel processing operation;
   calculating, with a designated processor, the global motion of the sensor from the calculated at least one parameter for each subsection of data;
   wherein the at least one parameter is one of:
     a. a feature point located in the subsection of data; and
     b. a state vector for the subsection of data;
   wherein the sensor comprise a visible light image sensor; configured to monitor only a set of predetermined frequency ranges of electromagnetic radiation.

4. The method of claim 3 wherein the second calculating step comprises calculating a global state vector from the feature points received from each of the processors.

5. The method of claim 3 wherein the second calculating step comprises combining the state vectors received from each of the processors into a global state vector.

6. The method of claim 3 wherein the first calculating step further comprising a cascading communicating step.

7. The method of claim 3 further comprising the steps of:
   providing a plurality of sensors each of which is sensitive to said set of predetermined frequency ranges of electromagnetic radiation, wherein said plurality of sensors includes therein said sensor; and
   wherein said plurality of sensors are mounted upon a single head worn structure.

* * * * *